(167.)
THOMAS W. WELSH.
Hose Coupling.
No. 122,873.  Patented Jan. 16, 1872.
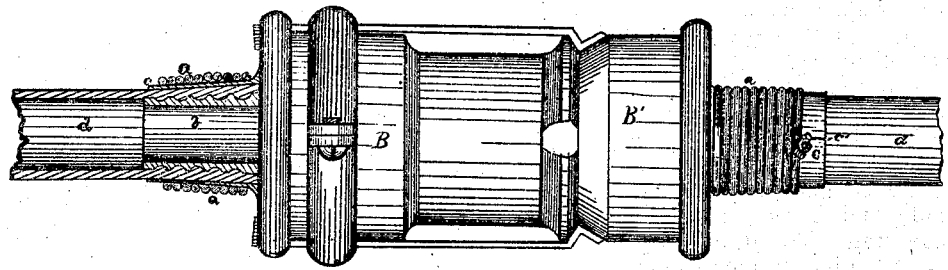

UNITED STATES PATENT OFFICE.

THOMAS W. WELSH, OF PITTSBURG, PENNSYLVANIA, ASSIGNOR TO THE WESTINGHOUSE AIR-BRAKE COMPANY, OF SAME PLACE.

IMPROVEMENT IN HOSE-COUPLINGS.

Specification forming part of Letters Patent No. 122,873, dated January 16, 1872.

SPECIFICATION.

*To all whom it may concern:*

Be it known that I, THOMAS W. WELSH, of Pittsburg, in the county of Allegheny and State of Pennsylvania, have invented a new and useful Improvement in Hose-Joint of Steam-Power Brake Pipes; and I do hereby declare the following to be a full, clear, and exact description thereof, reference being had to the accompanying drawing making part of this specification, which, by an outside view, partly in section, of a pair of couplings and hose, illustrates my improvement.

The present invention consists in an improvement in the joint invention of Ralph Bagaley and myself of devices for protecting the ends of India-rubber hose, which devices form the subject-matter of an application of even date herewith.

In the accompanying drawing, B represents the male, and B' the female parts of a hose-pipe coupling. To the base end of each is attached a thimble, $b$, over which is slipped the flexible hose $d$. To prevent now the fibrous material at the end of the hose from being injured (as it is liable to be, especially on the air or steam-pipes of power car-brakes) by the washings of the cars and car spittoons, I slip over the end of each hose-pipe $d$ a thimble, $c$, which is made of flexible sheet metal, and of such size as to fit closely on the hose and at one end bear against the base of the coupling. The joint $c'$ may be either a butt or lap-joint, preferably the latter, and the edges may be united by welding, soldering, or brazing, or not, at pleasure; though I prefer the latter construction, since then the sleeve $c$ may be made to hug the hose the tighter. The sleeve $c$ is then soldered to the base end of its coupling, and a wire, $a$, is tightly wrapped around, as shown, and fastened, whereby the sleeve is pressed tightly down on the hose, thus securing it firmly in place, and making so tight a joint as to prevent the washings of cars and spittoons from access to the otherwise exposed fibrous material at the end of the hose. The sleeve $c$ may be corrugated, if so preferred.

In this way the ends of the hose are at small expense protected from injury.

The hose on the end of an ordinary pipe may be protected by like means.

What I claim as my invention, and desire to secure by Letters Patent, is—

In combination with the hose $d$ and the pipe or coupling to which it is united, a sheet-metal compressing and water-protecting sleeve $c$, soldered to the pipe or coupling, with an outside wrapping of wire, substantially as set forth.

In testimony whereof I, the said THOMAS W. WELSH, have hereunto set my hand.

THOS. W. WELSH.

Witnesses:
ROBERT HILL,
ROBERT WHITESIDE.